US008422480B2

(12) United States Patent
Ho

(10) Patent No.: US 8,422,480 B2
(45) Date of Patent: Apr. 16, 2013

(54) ACKNOWLEDGE MODE POLLING WITH IMMEDIATE STATUS REPORT TIMING

(75) Inventor: Sai Yiu Duncan Ho, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 659 days.

(21) Appl. No.: 12/240,178

(22) Filed: Sep. 29, 2008

(65) Prior Publication Data

US 2009/0086704 A1    Apr. 2, 2009

Related U.S. Application Data

(60) Provisional application No. 60/976,756, filed on Oct. 1, 2007.

(51) Int. Cl.
*H04J 3/16* (2006.01)
(52) U.S. Cl.
USPC .......................................... 370/346; 370/328
(58) Field of Classification Search ................... 370/252, 370/328, 338, 346, 401
See application file for complete search history.

(56) References Cited

U.S. PATENT DOCUMENTS

| 5,313,635 | A  |   | 5/1994  | Ishizuka et al. |         |
|-----------|-----|---|---------|-----------------|---------|
| 6,687,248 | B2 | * | 2/2004  | Jiang           | 370/394 |
| 6,922,393 | B2 | * | 7/2005  | Jiang et al.    | 370/236 |
| 7,050,397 | B2 | * | 5/2006  | Cheng et al.    | 370/235 |
| 7,558,243 | B2 | * | 7/2009  | Jiang           | 370/346 |
| 7,869,396 | B2 | * | 1/2011  | Chun et al.     | 370/328 |
| 7,921,347 | B2 | * | 4/2011  | Kim et al.      | 714/749 |
| 2003/0005425 | A1 |   | 1/2003  | Zee             |         |
| 2005/0066255 | A1 | * | 3/2005  | Jiang           | 714/776 |
| 2006/0271355 | A1 |   | 11/2006 | Wang et al.     |         |
| 2007/0177630 | A1 | * | 8/2007  | Ranta et al.    | 370/473 |
| 2007/0271094 | A1 |   | 11/2007 | Ashley et al.   |         |

(Continued)

FOREIGN PATENT DOCUMENTS

CN    101009536 A    8/2007
JP    5088907 A    4/1993

(Continued)

OTHER PUBLICATIONS

International Search Report and Written Opinion—PCT/US2008/078372, International Search Authority—European Patent Office—Mar. 25, 2009.

(Continued)

*Primary Examiner* — Ricky Ngo
*Assistant Examiner* — Christine Ng
(74) *Attorney, Agent, or Firm* — Liem T. Do

(57) ABSTRACT

A wireless network avoids delays in receiving status reports by having transmitters make sure that any outstanding Hybrid Automatic Repeat-reQuest (HARQ) processes in progress are all finished before sending the polling request. Thus, the receiver can respond to any polling request of the transmitter immediately without delay. Since the transmitter already ensures all HARQ processes are done, the receiver's status report will accurately reflect the latest information. The transmitter may send a poll anytime regardless of the HARQ processes if the most up-to-date polling is determined to be not as important (e.g., when the transmitter is trying to advance its transmitter window, in which case the exact Status info is not critical). The receiver may then react immediate upon receiving the poll. Thereby, detecting the loss of any piece of data within a data burst is expedited.

32 Claims, 7 Drawing Sheets

U.S. PATENT DOCUMENTS

| | | | |
|---|---|---|---|
| 2007/0283032 A1* | 12/2007 | Kim et al. | 709/230 |
| 2008/0043619 A1* | 2/2008 | Sammour et al. | 370/231 |
| 2010/0063806 A1 | 3/2010 | Gao | |
| 2010/0286805 A1 | 11/2010 | Gao et al. | |
| 2011/0002266 A1 | 1/2011 | Gao | |

FOREIGN PATENT DOCUMENTS

| | | |
|---|---|---|
| JP | 2000122871 A | 4/2000 |
| JP | 2002542662 A | 12/2002 |
| JP | 2007053747 A | 3/2007 |
| WO | WO2004023736 | 3/2004 |
| WO | 2004047356 | 6/2004 |
| WO | WO2007079085 A2 | 7/2007 |

OTHER PUBLICATIONS

Qinqing Zhang, et al.,"Performance of UMTS radio link control" Proceedings of IEEE International Conference on Communications—Apr. 28-May 2, 2002—New York, tflY, USA, IEEE, Piscataway, NJ, USA, vol. 5, Apr. 28, 2002 3346-3350, XP010590089 ISBN: 978-0-7803-7400-3 the whole document.

Qualcomm Europe: "LTE RLC Polling and Status Report Timing" 3GPP Draft; R2-074374, 3rd Generation, Partnership Project (3GPP), Mobile Competence Centre ; 650, Route Des Lucioles ; F-06921 Sophia-Antipolis Cedex ; France, vol. tsg_ran\WG2_RL2\TSGR2_59bis\Docs, No. Shanghai, China; 20071008, Oct. 1, 2007 XP050136944 the whole document.

"Universal Mobile Telecommunications System (UMTS); Radio Link Control (RLC) , protocol specification (3GPP TS 25.322 version 7.2.0 Release 7); ETSI TS 125 322" ETSI Standards, Lis, Sophia Antipolis Cedex, France, vol. 3-R2, No. V7.2.0, Sep. 1, 2006, XP014035578 ISSN: 0000-0001 p. 51, paragraph 9.7.1—p. 60, paragraph 9.7.10.

3GPP TS 36.322 V8.0.0, 3rd Generation Partnership Project; Technical Specification Group Radio Access Network; Evolved Universal Terrestrial Radio Access (E-UTRA) Radio Link Control (RLC) protocol specification (Release 8), Dec. 2007.

Tdoc R2-073227, RLC status reporting mechanisms, TSG-RAN WG2 Meeting 58bis, Athens, Greece, Aug. 20-24, 2007, Ericsson.

R2-073476, LTE RLC PDU reordering, 3GPP TSG-RAN WG2 meeting #59, Athens, Greece, Aug. 20-24, 2007, Qualcomm Europe.

Catt,"ARQ Operation",3GPP TSG-RAN WG2#57 R2-070739, Feb. 2007,URL,http://www.3gpp.org/ftp/tsg_ran/WG2_RL2/TSGR2_57/Documents/R2-070739.zip.

Taiwan Search Report—TW097137782—TIPO—May 4, 2012.

\* cited by examiner

ACKNOWLEDGE MODE POLLING WITH IMMEDIATE STATUS REPORT TIMING

CLAIM OF PRIORITY UNDER 35 U.S.C. §119

The present Application for Patent claims priority to Provisional Application No. 60/976,756 entitled "LTE RLC POLLING AND STATUS REPORT TIMING" filed Oct. 1, 2007 and assigned to the assignee hereof and hereby expressly incorporated by reference herein.

FIELD

The present invention is related to wireless communication systems. More particularly, the present invention is related to a method and apparatus for implementing immediate status reporting without delay in a hybrid automatic repeat request (H-ARQ) communication channel.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems.

3GPP Long-term evolution (LTE) complements the success of High Speed Packet Access (HSPA) with higher peak data rates, lower latency and an enhanced broadband experience in high-demand areas. This is accomplished with the use of wider-spectrum bandwidths, Orthogonal Frequency-Division Multiple Access (OFDMA) and SC-FDMA (i.e., single carrier) air interfaces, and advanced antenna techniques. These techniques enable high spectral efficiency and an excellent user experience for a wide range of converged IP services. UMTS operators are rapidly adopting and offering IP services such as rich multimedia (e.g., video-on-demand, music download, video sharing), VoIP (Voice over IP), PTT (push to talk) and broadband access to laptops and PDAs. Operators offer these services through access networks such as HSPA, HSPA+ and LTE. In LTE as described in 3GPP TS 36.300 technical specification for EU-TRAN, one serving evolved base node (eNB) communicates via an uplink (UL) and downlink (DL) channel with user equipment (UE), thereby providing legacy interoperability by not depending upon dual mode communications.

Automatic Repeat-reQuest (ARQ) is an error control method for data transmission that uses acknowledgments and timeouts to achieve reliable data transmission. An acknowledgment is a message sent by the receiver to the transmitter to indicate that it has correctly received a data frame. A timeout is a reasonable point in time measured after the sender sends the data frame such that, if the sender does not receive an acknowledgment before the timeout, it usually re-transmits the frame until it receives an acknowledgment or exceeds a predefined number of re-transmissions.

A variation of ARQ is known as "Hybrid ARQ" (HARQ), which is generally considered to have better performance—particularly over wireless channels—at the cost of increased implementation complexity. In HARQ forward error correction (FEC) bits are also added to any existing Error Detection (ED) bits. As a result, HARQ performs better than ordinary ARQ in poor signal conditions, but in its simplest form this comes at the expense of significantly lower throughput in good signal conditions.

For LTE, whenever an RLC (Radio Link Control) transmitter sends a polling request to a receiver, the receiver can respond with a Status Report, which contains presumably up-to-date RLC PDU (protocol data unit) information at the receiver. One problem may arise when, at the time that the receiver receives the polling request, there could still be some RLC PDUs being delivered by the HARQ layer and, hence, any Status Report formed by the receiver at that point in time may not take into account those PDUs. For instance the HARQ introduces out-of-sequence data due to processes finishing earlier than another. As a result, when an RLC receiver receives a poll and takes a snap shot of the RLC status, the status may not be accurate. Some RLC PDUs can still be in the process of being delivered and not accounted by the status report.

It has been suggested that the receiver should wait for a timer before forming the Status Report so as to let the HARQ processes finish before reporting, enabling the HARQ to account for those PDUs in transit. This requires either a simple timer or gap detection (i.e., a more sophisticated method) at the receiver. The problem with this approach is a fixed delay will be incurred before the receiver can send a Status Report—even if there is nothing being transmitted on the HARQ processes.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In accordance with one or more aspects and corresponding disclosure thereof, various aspects are described in connection with addressing situations in avoid a delay imposed at the receiver for handling a worst-case of ensuring that HARQ has been completed for transmitted RLC PDUs. The transmitter is in a better situation to know whether it is necessary that a status report be accurate and whether HARQ has been completed as compared to what has been sent. Thereby, advantages are achieved such as expediting detection of the loss of any piece of data within a data burst (e.g., any RLC PDU that contains a segment of an radio resource control (RRC) message that is lost in the HARQ layer. As another example, the status report will contain the most accurate information when needed. As an additional example, the status report is achieved in a most expeditious manner.

In one aspect, a method provides radio link control (RLC) polling and status report timing in a wireless network. Data packets are transmitted in an acknowledge mode communication channel to a receiver. A determination is made that status reporting from the receiver is warranted. A polling status request is transmitted. A status report is received from the receiver sent without delay.

In another aspect, at least one processor provides for radio link control (RLC) polling and status report timing in a wireless network. A first module transmits data packets in an acknowledge mode communication channel to a receiver. A second module determines that status reporting from the receiver is warranted. A third module transmits a polling status request. A fourth module receives a status report from the receiver sent without delay.

In an additional aspect, a computer program product provides for radio link control (RLC) polling and status report timing in a wireless network by having a computer-readable storage medium comprising sets of codes. A first set of codes causes a computer to transmit data packets in an acknowledge mode communication channel to a receiver. A second set of codes causes the computer to determine that status reporting from the receiver is warranted. A third set of codes causes the computer to transmit a polling status request. A fourth set of codes causes the computer to receive a status report from the receiver sent without delay.

In another additional aspect, an apparatus provides radio link control (RLC) polling and status report timing in a wireless network. Means are provided for transmitting data packets in an acknowledge mode communication channel to a receiver. Means are provided for determining that status reporting from the receiver is warranted. Means are provided for transmitting a status request. Means are provided for receiving a status report from the receiver sent without delay.

In a further aspect, an apparatus provides radio link control (RLC) polling and status report timing in a wireless network. A transmitter component transmits data packets in an acknowledge mode communication channel to a receiver. An RLC poll criteria component determines that status reporting from the receiver is warranted. The transmitter component transmits a polling status request. A receiver component receives a status report from the receiver sent without delay.

In yet one aspect, a method provides radio link control (RLC) polling and status report timing in a wireless network. Data packets are received in an acknowledge mode communication channel from a transmitter. A polling status request is received when the transmitter has determined that status reporting from the receiver is warranted. A status report is transmitted from the receiver sent without delay.

In yet another aspect, at least one processor provides radio link control (RLC) polling and status report timing in a wireless network. A first module receives data packets in an acknowledge mode communication channel from a transmitter. A second module receives a polling status request when the transmitter has determined that status reporting from the receiver is warranted. A third module transmits a status report from the receiver sent without delay.

In yet an additional aspect, a computer program product provides radio link control (RLC) polling and status report timing in a wireless network by having a computer-readable storage medium comprising sets of codes. A first set of codes causes a computer to receive data packets in an acknowledge mode communication channel from a transmitter. A second set of codes causes the computer to receive a polling status request when the transmitter has determined that status reporting from the receiver is warranted. A third set of codes causes the computer to transmit a status report from the receiver sent without delay.

In yet another additional aspect, an apparatus provides radio link control (RLC) polling and status report timing in a wireless network. Means are provided for receiving data packets in an acknowledge mode communication channel from a transmitter. Means are provided for receiving a polling status request when the transmitter has determined that status reporting from the receiver is warranted. Means are provided for transmitting a status report from the receiver sent without delay.

In yet a further aspect, an apparatus provides radio link control (RLC) polling and status report timing in a wireless network. A receiver component receives data packets in an acknowledge mode communication channel from a transmitter and receives a polling status request when the transmitter has determined that status reporting from the receiver is warranted. A transmitter component transmits a status report from the receiver sent without delay.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

Figure 1:
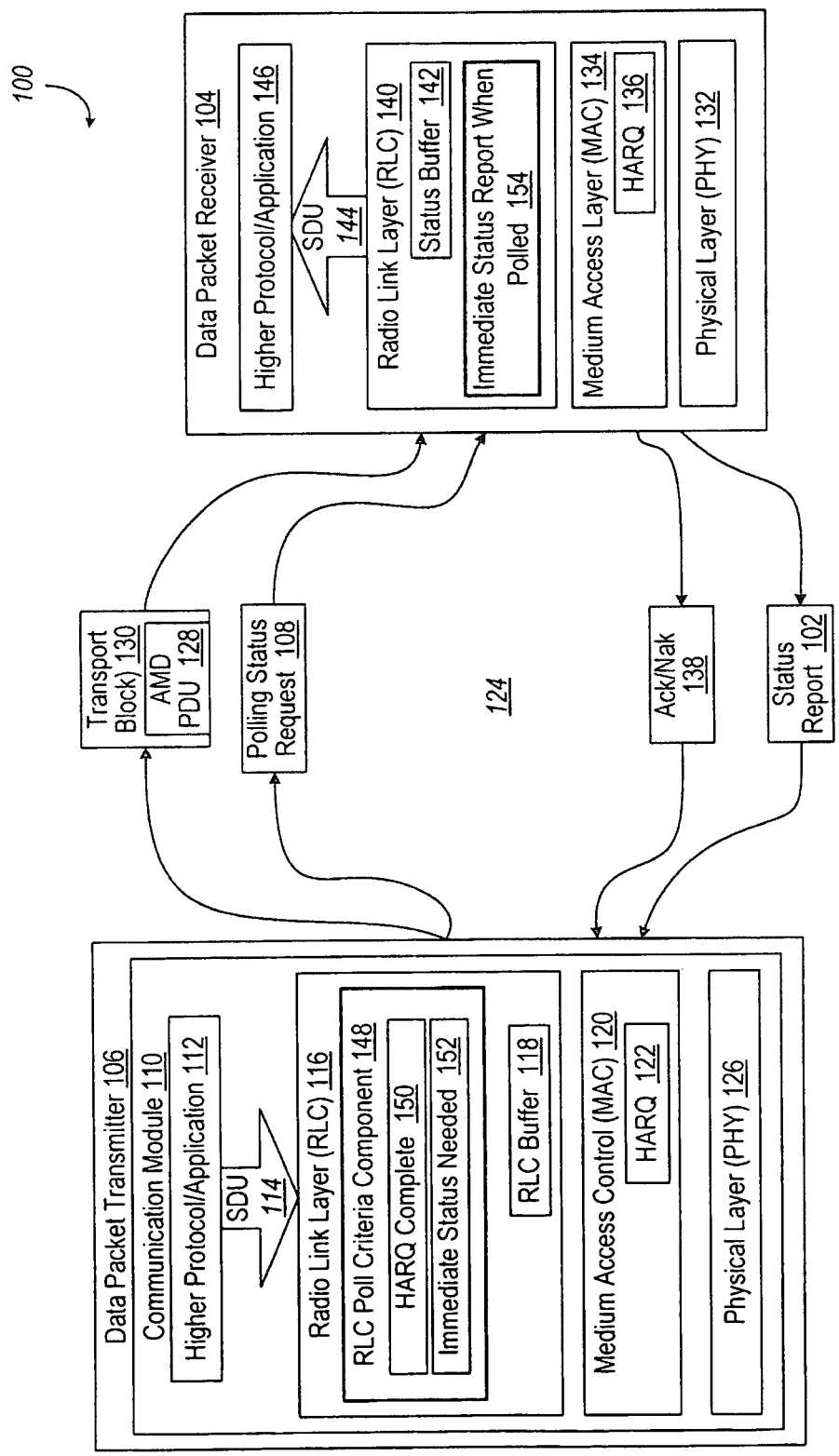
FIG. 1 illustrates a block diagram of a wireless communication system of a user equipment (UE) moving from a coverage area of source radio access network (RAN) to a neighboring RAN warranting a handover.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a server and the server can be a component. One or more components may reside within a process or thread of execution and a component may be localized on one computer or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the one or more versions may be implemented as a method, apparatus, or article of manufacture using standard programming or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

Various aspects will be presented in terms of systems that may include a number of components, modules, and the like. It is to be understood and appreciated that the various systems may include additional components, modules, etc. or may not include all of the components, modules, etc. discussed in connection with the figures. A combination of these approaches may also be used. The various aspects disclosed herein can be preformed on electrical devices including devices that utilize touch screen display technologies or mouse-and-keyboard type interfaces. Examples of such devices include computers (desktop and mobile), smart phones, personal digital assistants (PDAs), and other electronic devices both wired and wireless.

Referring initially to FIG. 1, a wireless network 100 avoids delays in receiving status reports 102 from a receiver 104 by having a transmitter 106 make sure that any outstanding Hybrid Automatic Repeat-reQuest (HARQ) processes in progress are all finished before sending the polling status request 108. Thus, the receiver 104 can respond to any polling status request 108 of the transmitter 106 immediately with no delay. Since the transmitter 106 already ensures all HARQ processes are done, the status report 102 of the receiver 104 will accurately reflect the latest information. The transmitter 106 may send a poll anytime regardless of the HARQ processes if the most up-to-date polling is determined to be not as important as an immediate status report (e.g., when the transmitter 106 is trying to advance its transmitter window, in which case the exact status information is not critical). The receiver 104 may then react immediate upon receiving the poll.

In use, a communication module 110 of the data packet transmitter 106 includes protocol stack with higher protocol/application layer(s) 112 that provides service data units (SDUs) 114 that are processed by a radio link control (RLC) 116. The RLC 116 has an RLC buffer 118 of RLC protocol data units (PDUS) that are processed by a medium access control (MAC) entity 120 that has a HARQ component 122 that manages acknowledge mode (AM) data over an air link 124 to the receiver 104. A physical (PHY) layer 126 transmits AM data (AMD) 128 within an available transport block 130 over the air link 124, received by a PHY layer 132 of the receiver 104. A MAC entity 134 of the receiver 104 has a HARQ component 136 that generates acknowledgements of successful or unsuccessful receipt of the AMD PDUs, depicted as Ack/Nak responses 138. An RLC 140 decodes RLC PDUs, keeping an up-to-date status in an RLC status buffer 142 of delivery of SDUs 144 to higher level protocol/application(s) 146.

Advantageously the RLC 116 of the transmitter 106 has an RLC poll criteria component 148 that can determine what has been sent and what HARQ Ack/Nak responses 138 have been received at the HARQ component 122 of the MAC 120 as well as what condition is indicating a need for a polling status request. Sending of the polling status request 108 can be deferred until one of two criterion are satisfied, depicted as a HARQ complete criterion 150 and an immediate status needed criterion 152, the latter being a situation in which it is not necessary that all data packets have been delivered yet. An immediate status report component 154 of the RLC 140 of the receiver 104 responds immediately without delay to a polling status request 108 to send the status report 102 without regard to whether HARQ processes have completed.

Some advantages of this solution include detecting the loss of any piece of data within a data burst is expedited (e.g., any radio link control (RLC) protocol data unit (PDU) that contains a segment of an radio resource control (RRC) message is "lost" in the HARQ layer); the Status Report will always contain the most accurate information. The Radio Resource Control (RRC) belong to the UMTS WCDMA protocol stack and handles the control plane signaling of Layer 3 between the UEs (User Equipments) and UTRAN and perform functions for connection establishment and release, broadcast of system information, Radio Bearer establishment, reconfiguration and releases, RRC Connection mobility procedures, paging notification and release, outer loop power control. Further, if the transmitter implements local NACKing, RLC may already interact with HARQ, which this is just a natural extension; and it can be the fastest way to get the most accurate status from the receiver as compared to having the receiver wait before sending back the Status Report.

Figure 2:
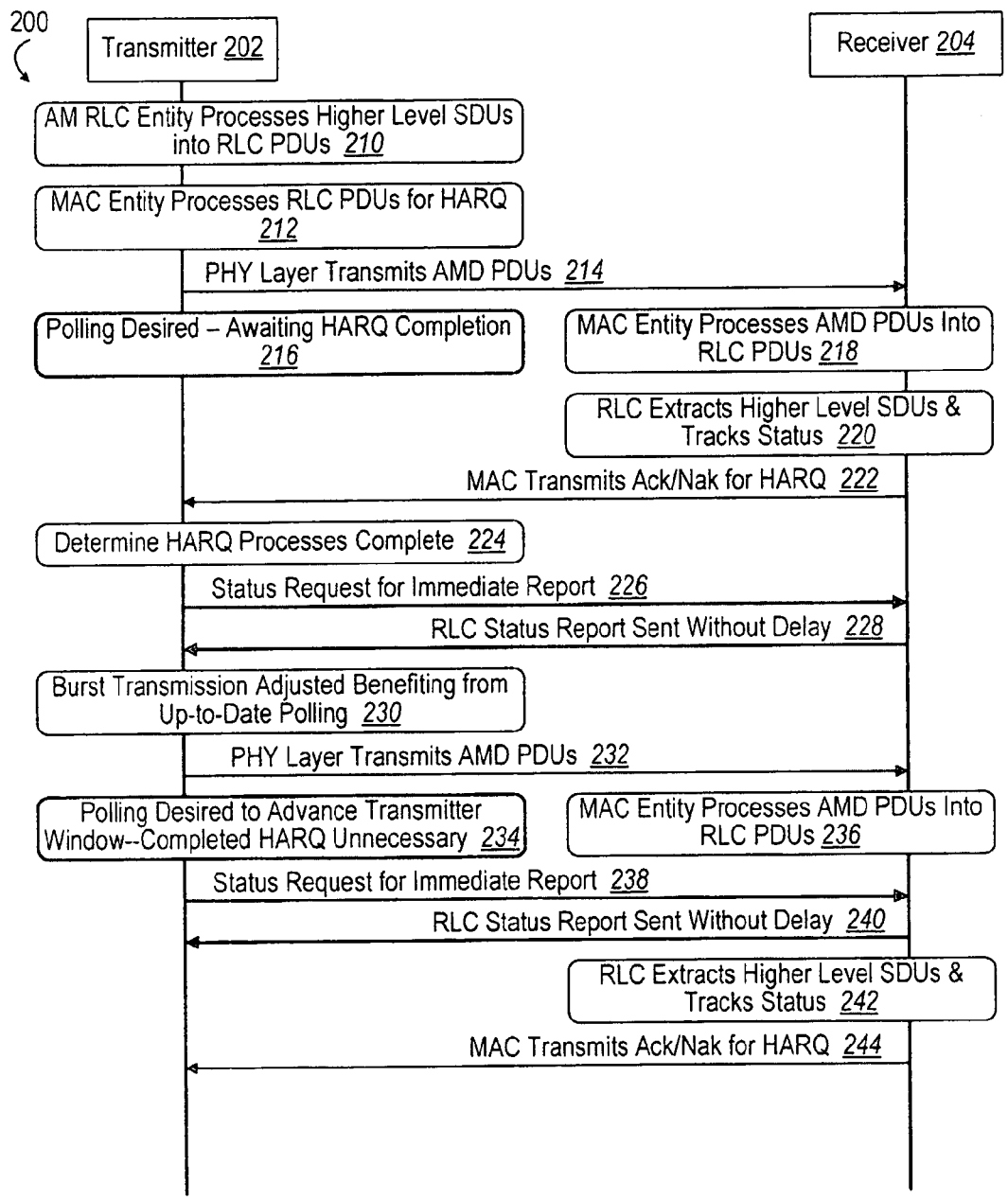
FIG. 2 illustrates a timing diagram of a methodology for hard handover of an uplink over-the-air link with a UE.

FIG. 2 illustrates methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts. For example, acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring to FIG. 2, a methodology 200 for provides for radio link control (RLC) polling and status report timing in a wireless network comprising a transmitter 202 and a receiver 204. In block 210, the transmitter 202 has an AM RLC entity that processes higher level SDUs into RLC PDUs. In block 212, a MAC entity processes RLC PDUs for HARQ. In block

214, a PHY layer wirelessly transmits AMD PDUs to the receiver 204. Before HARQ processes (i.e., only the HARQ processes that are actively delivering RLC PDUs from the same RLC process) have completed, in block 216 the transmitter 202 determines that a need exits for a polling status request, but further determines that an up-to-date status report is required. For example, if the polling request is triggered by the last data in the RLC buffer, the transmitter can wait for all the HARQ instances to finished (i.e., HARQ instance reports a "success" or "failure" to RLC) before sending the polling request. Rather than an arbitrary delay, the transmitter 202 is in a position to know when all HARQ processes have completed rather than imposing some arbitrary delay at the receiver 204. Thus, the transmitter 202 waits for HARQ processes to complete.

In block 218 the receiver 204 has a MAC entity that processes the AMD PDUs into RLC PDUs 218. In block 220, an RLC of the receiver 204 extracts higher level SDUs and tracks RLC PDU delivery status. The MAC of the receiver 204 transmits an acknowledgement of data packet delivery (i.e., Ack/Nak), depicted at 222.

In block 224, the transmitter 202 determines that the HARQ processes are complete by comparing tracking of transmission to the acknowledgements from the receiver 204. The transmitter 202 can thus transmit the polling status request for an immediate report as depicted at 226, which responds immediately without delay with an RLC status report as depicted at 228. This polling status request can be accomplished through any number of special or standardized HARQ polling status request or triggered via some other event defined to accomplish the same effect. In block 230, the transmitter is able to perform a burst transmission adjusted to benefit from up-to-date polling expedited by detecting the loss of any piece of data within a data burst.

In another aspect, the methodology 200 can request an immediate status report without waiting for HARQ processes to finish. As depicted at 226, an RLC process is begun by the PHY layer of the transmitter 202 transmitting AMD PDUs. The transmitter 202 then determines in block 234 that polling is desired immediately, such as to advance a transmitter window and that completion of the HARQ process is not necessary or as high a priority. Meanwhile the MAC entity of the receiver 204 processes the AMD PDUs into RLC PDUs in bloc 236. The transmitter 202 transmits a polling status request to the receiver 204 as depicted at 238, which responds with an RLC status report without delay as depicted 240. Then the receiver completes the HARQ processes in block 242, depicted as the RLC extracting higher level SDUs and tracking delivery status. Then the MAC of the receiver 204 transmits acknowledgement (Ack/Nak) to complete the HARQ processes as depicted at 244.

Figure 3:
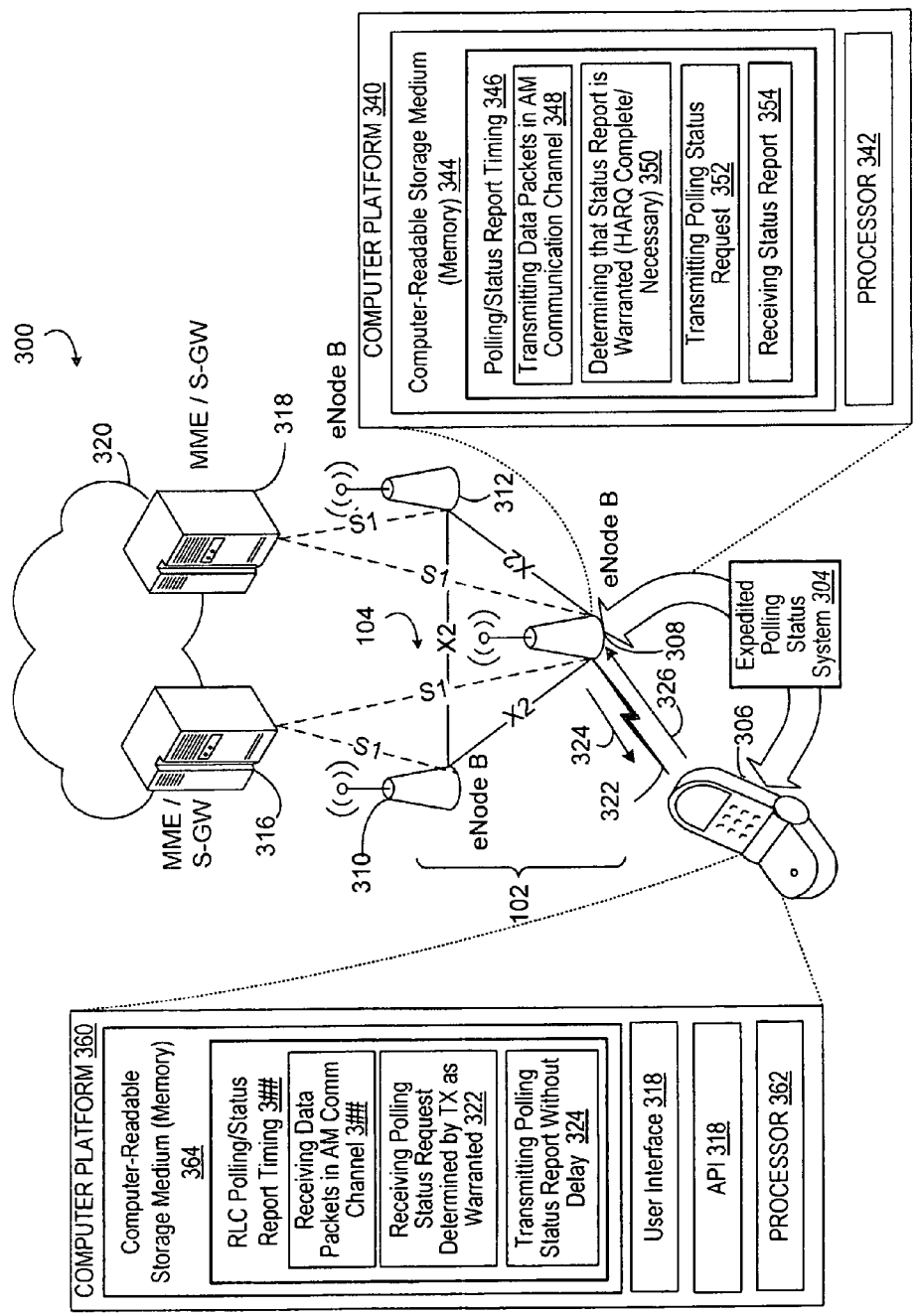
FIG. 3 illustrates a timing diagram of a methodology for hard handover of a downlink over-the-air link with a UE.

Referring to FIG. 3, in one aspect, a communication system 300 includes an evolved Universal Mobile Telecommunications System (UMTS) Terrestrial Radio Access Network (E-UTRAN) 302 that incorporates an expedited status reporting system 304 between a user equipment (UE) 306 and one evolved base node (eNB) 308, with other eNB 310, 312 also depicted, in accordance with 3GPP LTE (Third Generation. Partnership Project Long Term Evolution) protocols as modified consistent with aspects herein.

The eNode Bs 308, 310, 312 provide an UMTS Terrestrial Radio Access (E-UTRA) user plane and control plane (RRC) protocol terminations towards the UE 306. The user plane can comprise of 3GPP (3rd Generation, Partnership Project) Packet Data Convergence Protocol (PDCP), radio link control (RLC), medium access control (MAC) and physical layer control (PHY). The eNode B 310-112 are interconnected with each other by means of X2 interface ("X2"). The eNode Bs 308, 310, 312 are also connected by means of an S1 interface ("S1") to an EPC (Evolved Packet Core), more specifically to Mobility Management Entities/Serving Gateways (MME/S-GW) 316, 318 connected to a data packet network 320. The S1 interface supports a many-to-many relation between MMEs/S-GW 316, 318 and eNode Bs 308, 310, 312. A network interface X2 between eNodeB 308, 310, 312 is used for coordinating handovers and other functions. An air link 322 is active between eNode B 308 and the UE 306.

The eNode Bs 308, 310, 312 hosts the following functions: radio resource management: radio bearer control, radio admission control, connection mobility control, dynamic allocation of resources to UEs 306 in both uplink and downlink (scheduling); IP header compression and encryption of user data stream; selection of an MME at UE attachment; routing of user plane data towards serving gateway; scheduling and transmission of paging messages (originated from the MME); scheduling and transmission of broadcast information; and measurement and measurement reporting configuration for mobility and scheduling.

The MME hosts the following functions: distribution of paging messages to the eNode Bs 308, 310, 312; security control; idle state mobility control; System Architecture Evolution (SAE) bearer control; ciphering and integrity protection of Non-Access Stratum (NAS) signaling. The Serving Gateway hosts the following functions termination of U-plane packets for paging reasons and switching of U-pane for support of UE mobility.

An over-the-air (OTA) downlink (DL) 324 of the air link 322 from the eNode B 308 can include a plurality of communication channels relevant to download allocation. Three different types of physical (PHY) channels are defined for the LTE downlink 324. One common characteristic of physical channels is that they all convey information from higher layers in the LTE stack. This is in contrast to physical signals, which convey information that is used exclusively within the PHY layer.

LTE DL physical channels are Physical Downlink Shared Channel (PDSCH), Physical Downlink Control Channel (PDCCH), and Common Control Physical Channel (CCPCH). Physical channels map to transport channels, which are service access points (SAPs) for the L2/L3 layers. Each physical channel has defined algorithms for bit scrambling, modulation, layer mapping, cyclic delay diversity (CDD) preceding, resource element assignment; layer mapping and pre-coding are related to MIMO applications. A layer corresponds to a spatial multiplexing channel.

A Broadcast Channel (BCH) has a fixed format and is broadcast over an entire coverage area of a cell. A Downlink Shared Channel (DL-SCH) supports Hybrid ARQ (HARQ), supports dynamic link adaption by varying modulation, coding and transmit power, is suitable for transmission over entire cell coverage area, is suitable for use with beamforming, supports dynamic and semi-static resource allocation, and supports discontinuous receive (DRX) for power save. A Paging Channel (PCH) supports UE DRX, requires broadcast over entire cell coverage area, and is mapped to dynamically allocated physical resources. A Multicast Channel (MCH) is required for broadcast over entire cell coverage area, supports Multicast/broadcast-single frequency network (MB-SFN), supports semi-static resource allocation. Supported transport channels are Broadcast channel (BCH), Paging channel (PCH), Downlink shared channel (DL-SCH), and Multicast channel (MCH). Transport channels provide the following functions: structure for passing data to/from higher layers, a mechanism by which higher layers can configure the PHY status indicators (packet error, CQI etc.) to higher layers, and support for higher-layer peer-to-peer signaling. Transport channels are mapped to physical channels as follows: BCH maps to CCPCH, although mapping to PDSCH under consideration. PCH and DL-SCH map to PDSCH. MCH may be manned to PDSCH.

A higher-level protocol or application of the transmitter (e.g., eNB 308 for DL 324 or the UE 306 for an uplink (UL) 326) has content for communication such as Internet Protocol (IP) packets that are transferred as a service data unit (SDU) to an upper level protocol, such as a Packet Data Convergence Protocol (PDCP) for functions such as ciphering that produces packet data units (PDUs). The PDCP transports the PDUs as service data units (SDUs) to a service access point of a lower layer protocol, such as a Radio Link Layer (RLC).

The PDCP and the RLC are adjacent protocols in the 'layer two' of a telecommunication system that, among other things enable ARQ (Automatic Repeat re-Quest) as for example the RLC of HSPA and the RLC of LTE in 3GPP. Furthermore, aspects and techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA is part of Universal Mobile Telecommunication System (UMTS). E-UTRA is part of the 3GPP Long Term Evolution, an upcoming release of 3GPP, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2). These various radio technologies and standards are known in the art.

The eNode B 308 acts as transmitter and can advantageously include a computer platform 340 having at least one processor 342 for executing modules in computer-readable storage medium (memory) 344 for sending AM communication with the UE 306. An RLC Polling/Status Report Timing Component 346 can comprise sets of codes and data in memory 344 executed by the processor(s) 342. In an illustrative aspect, a first module 348 transmits data packets in an acknowledge mode communication channel to a receiver. A second module 350 determines that status reporting from the receiver is warranted. A third module 352 transmits a polling status request. A fourth module 354 receives a status report from the receiver sent without delay.

The UE 306 acts as receiver and can advantageously include a computer platform 360 having at least one processor 362 for executing modules in a computer-readable storage medium (memory) 364 for receiving AM communication from the eNode B 308. The processor(s) 362 may be an application-specific integrated circuit (ASIC), or other chipset, processor, logic circuit, or other data processing device. An RLC Polling/Status Report Timing Component 366 can comprise sets of codes and data in memory 364 executed by the processor(s) 362. In an illustrative aspect, a first module 368 receives data packets in an acknowledge mode communication channel from a transmitter. A second module 370 receives a polling status request when the transmitter has determined that status reporting from the receiver is warranted. A third module 372 transmits a status report from the receiver sent without delay.

The memories 344, 364 can comprise volatile and nonvolatile memory portions, such as read-only and/or random-access memory (RAM and ROM), erasable programmable read-only memory (EPROM), electrically erasable programmable read-only memory (EEPROM), flash memory, and/or any memory common to computer platforms. Further, memory may include active memory and storage memory, including an electronic file system and any secondary and/or tertiary storage device, such as magnetic media optical media, tape, soft and/or hard disk, and removable memory components.

In an illustrative aspect, the UE 306 may comprise a mobile wireless and/or cellular telephone. Alternatively, the UE 306 may comprise a fixed communication device, such as a Proxy Call/Session Control Function (P-CSCF) server, a network device, a server, a computer workstation, etc. It should be understood that UE 306 is not limited to such described or illustrated devices, but may further include a Personal Digital Assistant (PDA), a two-way text pager, a portable computer having a wired or wireless communication portal, and any type of computer platform having a wired and/or wireless communications portal. Further, the UE 306 can be a remote-slave or other similar device, such as remote sensors, remote servers, diagnostic tools, data relays, and the like, which does not have an end-user thereof, but which simply communicates data across a wireless or wired network. In alternate aspects, the UE 306 may be a wired communication device, such as a landline telephone, personal computer, set-top box or the like. Additionally, it should be noted that any combination of any number of UE 306 of a single type or a plurality of the afore-mentioned types may be utilized in a cellular communication system (not shown). Therefore, the present apparatus and methods can accordingly be performed on any form of wired or wireless device or computer module, including a wired or wireless communication portal, including without limitation, wireless modems, Personal Computer Memory Card International Association (PCMCIA) cards, access terminals, personal computers, telephones, or any combination or sub-combination thereof. Additionally, the UE 306 may include a user interface 374.

It should be appreciated that the user interface 374 can include an input device operable to generate or receive a user input into the UE 306, and an output device operable to generate and/or present information for consumption by the user of the UE 306. For example, input device may include at least one device such as a keypad and/or keyboard, a mouse, a touch-screen display, a microphone in association with a voice recognition module, etc. Further, for example, output device may include a display, an audio speaker, a haptic feedback mechanism, etc. Output device 506 may generate a graphical user interface, a sound, a feeling such as a vibration or a Braille text producing surface, etc.

Figure 4:
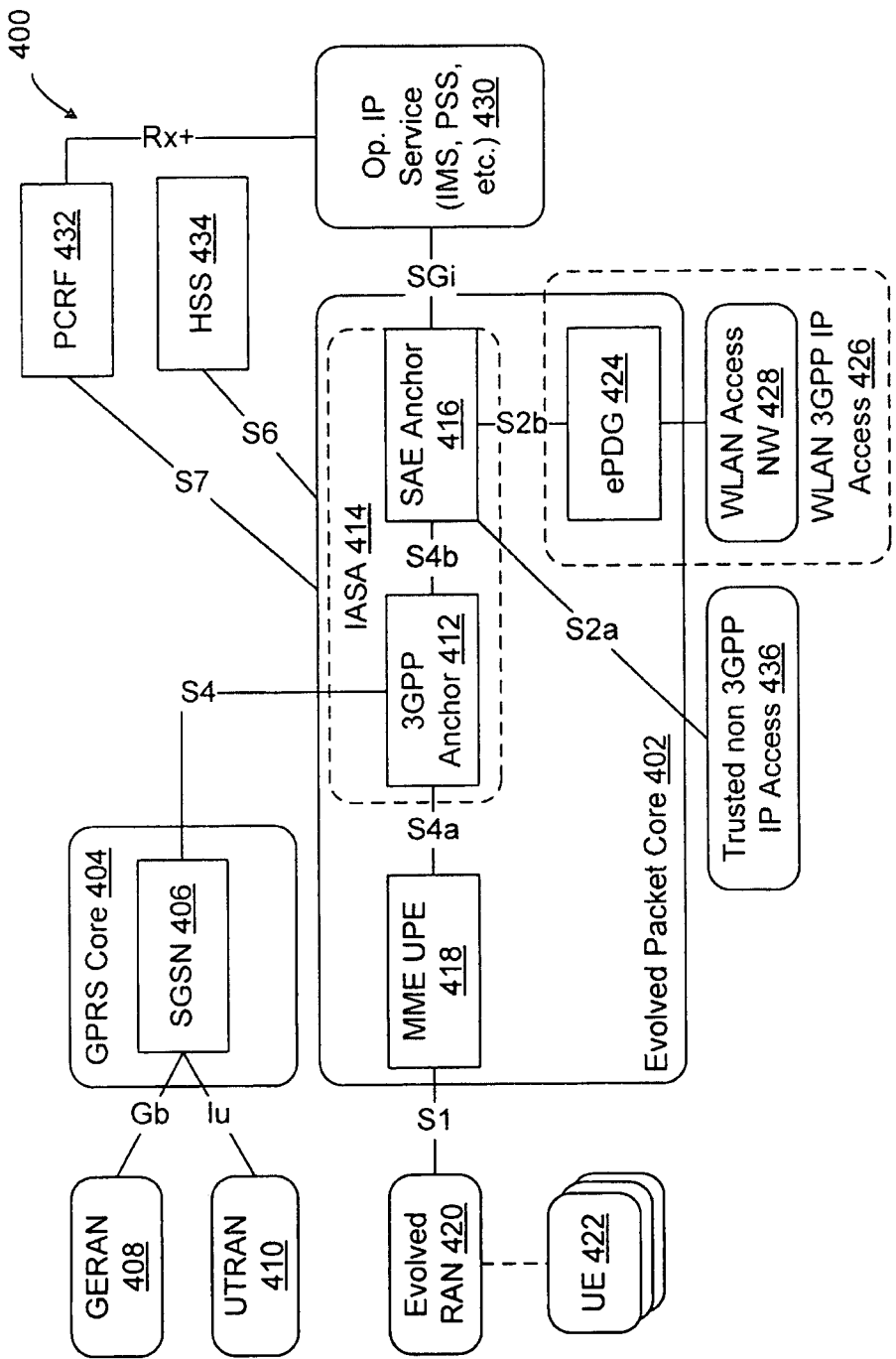
FIG. 4 illustrates a block diagram of a communication system enhanced to support inter-system handovers.

In FIG. 4, in another aspect, a communication system 400 that can support the wireless network 100 of FIG. 1 includes support for interfacing an evolved packet core 402 via an interface S4 with a legacy General Packet Radio Service (GPRS) core 404, whose Serving GPRS Support Node (SGSN) 406 is interfaced in turn by a Gb interface to a Global System for Mobile Communications (GSM)/Edge Radio Access Network (GERAN) 408 and via an Iu interface to a UTRAN 410.

It should be appreciated with the benefit of the present disclosure that GPRS Support Nodes (GSN) are network nodes that support the use of GPRS in the GSM core network. There are two key variants of the GSN including Gateway GPRS Support Node (GGSN) and Serving GPRS Support Node (SGSN). A GGSN can provide an interface between the GPRS backbone network and the external packet data networks (radio network and the IP network). It can convert GPRS packets coming from the SGSN into the appropriate packet data protocol (PDP) format (e.g. IP or X.25) and send the converted packets them to the corresponding packet data network. In the other direction, PDP addresses of incoming data packets may be converted to the GSM address of a destination user. The readdressed packets may then be sent to the responsible SGSN. For this purpose, the GGSN can store the current SGSN address of the user and his or her profile in its location register. The GGSN can provide IP address assignment and is generally the default router for a particular UE.

In contrast, an SGSN can be responsible for the delivery of data packets from/to mobile stations within its geographical service area. The tasks of an SGSN can include packet routing and transfer, mobility management, logical link management, authentication and charging functions.

Continuing, the GPRS tunneling protocol for the user plane (GTP-U) layer may be used on the user-plane (U-plane) and is useful for transmitting user data in a packet switched area. Packet switched networks in the Universal Mobile Telecommunications System (UMTS) are based on GPRS, and therefore, the GTP-U may also be used in the UMTS. UMTS is one of the third-generation (3G) cell phone technologies. UMTS is sometimes referred to as 3GSM, which hints at both its 3G background and the GSM standard for which it was designed to succeed.

Returning to FIG. 4, the S4 provides the user plane with related control and mobility support between GPRS Core 404 and a 3GPP Anchor 412 of an Inter Access Stratum Anchor (IASA) 414 and is based on a Gn reference point as defined between SGSN 406 and Gateway GPRS Serving/Support Node (GGSN) (not shown). The IASA 414 also includes a system architecture evolved (SAE) anchor 416 interfaced to the 3GPP anchor 412 by an S5b interface that provides the user plane with related control and mobility support. The 3GPP anchor 412 communicates with an MME UPE 418 via interface S5a. Mobility Management entity (MME) pertains to distribution of paging messages to the eNBs and User Plane Entity (UPE) pertains to IP header compression and encryption of user data streams, termination of U-plane packets for paging reasons, and switching of U-plane for support of UE mobility. The MME UPE 418 communicates via interface S1 to an evolved RAN 420 for wirelessly communicating with UE devices 422.

An S2b interface provides the user plane with related control and mobility support between the SAE Anchor 416 and an evolved Packet Data Gateway (ePDG) 424 of a wireless local access network (WLAN) 3GPP IP Access component 426 that also includes a WLAN Access network (NW) 428. An SGi interface is the reference point between the Inter AS Anchor 416 and a packet data network 430. Packet data network 430 may be an operator external public or private packet data network or an intra operator packet data network, e.g. for provision of IP Multimedia Subsystem (IMS) services. This SGi reference point corresponds to Gi and Wi functionalities and supports any 3GPP and non-3GPP access systems. An Rx+ interface provides communication between the packet data network 430 and a policy and charging rules function (PCRF) 432, which in turn communicates via an S7 interface to the evolved packet core 402. The S7 interface provides transfer of (QoS) policy and charging rules from PCRF 432 to Policy and Charging Enforcement Point (PCEP) (not shown). An S6 interface (i.e., AAA interface) enables transfer of subscription and authentication data for authenticating/authorizing user access by interfacing the evolved packet core 402 to a home subscriber service (HSS) 434. An S2a interface provides the user plane with related control and mobility support between a trusted non-3GPP IP access 436 and the SAE Anchor 416.

It should be appreciated that wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP LTE systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

Figure 5:
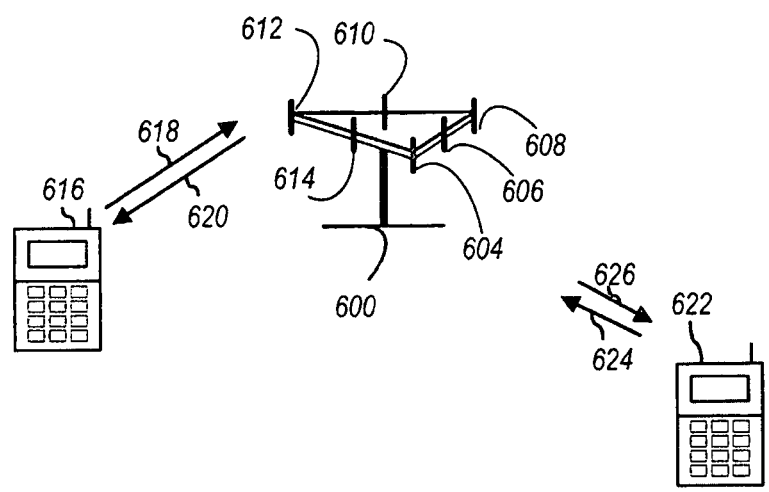
FIG. 5 illustrates a diagram of a multiple access wireless communication system according to one aspect for supporting handovers.

Referring to FIG. 5, a multiple access wireless communication system according to one aspect is illustrated. An access point 600 (AP) includes multiple antenna groups, one including 604 and 606, another including 608 and 610, and an additional including 612 and 614. In FIG. 5, only two antennas are shown for each antenna group, however, more or fewer antennas may be utilized for each antenna group. Access terminal 616 (AT) is in communication with antennas 612 and 614, where antennas 612 and 614 transmit information to access terminal 616 over forward link 620 and receive information from access terminal 616 over reverse link 618. Access terminal 622 is in communication with antennas 606 and 608, where antennas 606 and 608 transmit information to access terminal 622 over forward link 626 and receive information from access terminal 622 over reverse link 624. In a FDD system, communication links 618, 620, 624 and 626 may use different frequency for communication. For example, forward link 620 may use a different frequency then that used by reverse link 618.

Each group of antennas or the area in which they are designed to communicate is often referred to as a sector of the access point. In the aspect, antenna groups each are designed to communicate to access terminals in a sector, of the areas covered by access point 600.

In communication over forward links 620 and 626, the transmitting antennas of access point 600 utilize beamforming in order to improve the signal-to-noise ratio of forward links for the different access terminals 616 and 624. In addition, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 6:
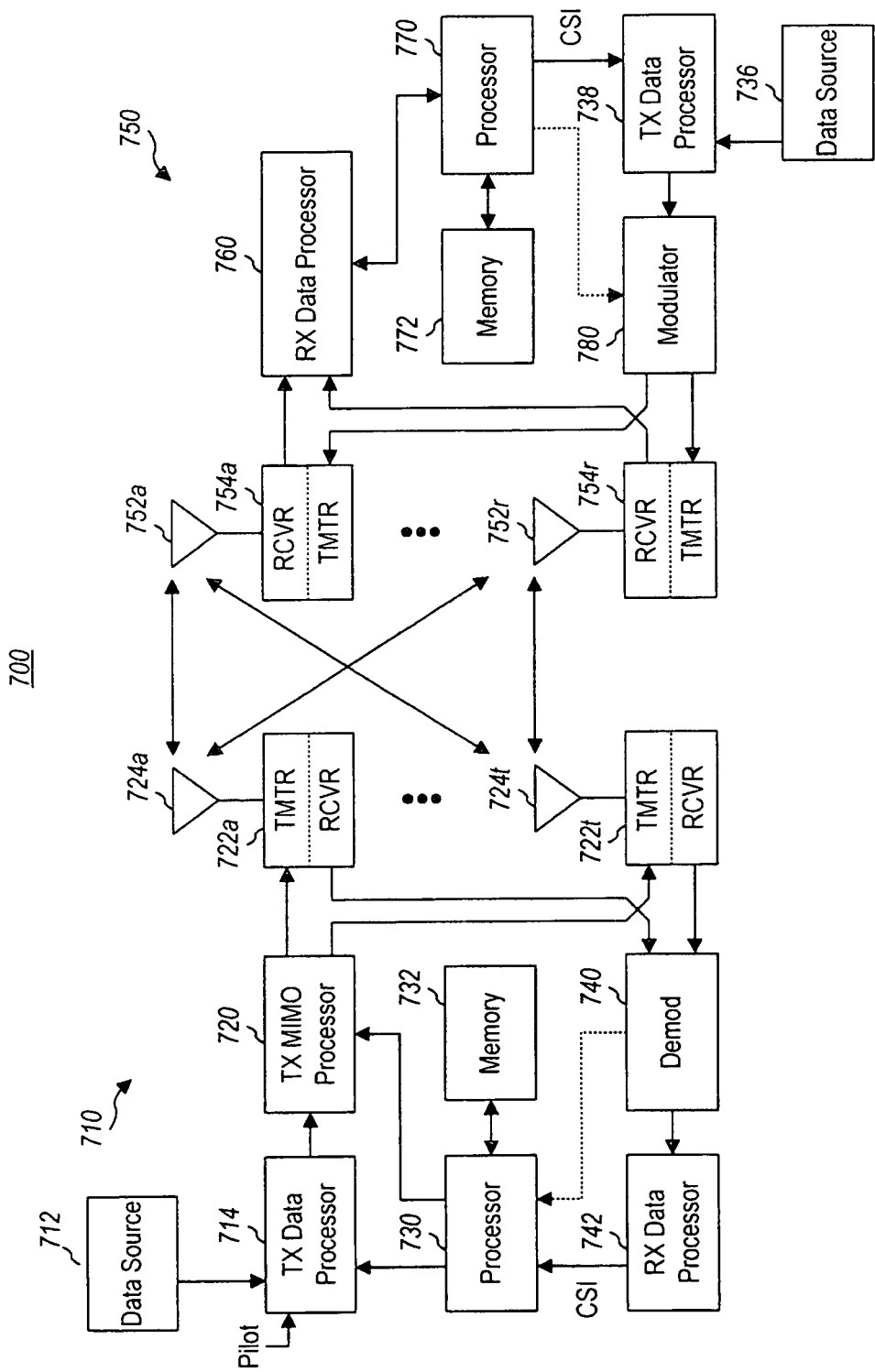
FIG. 6 illustrates a schematic block diagram of a communication system for supporting handover.

FIG. 6 is a block diagram of an aspect of a transmitter system 710 (also known as the access point) and a receiver system 750 (also known as access terminal) in a MIMO system 700. At the transmitter system 710, traffic data for a number of data streams is provided from a data source 712 to a transmit (TX) data processor 714.

In an aspect, each data stream is transmitted over a respective transmit antenna. TX data processor 714 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 730.

The modulation symbols for all data streams are then provided to a TX MIMO processor 720, which may further process the modulation symbols (e.g., for OFDM). TX MIMO processor 720 then provides $N_T$ modulation symbol streams to $N_T$ transmitters (TMTR) 722a through 722t. In certain implementations, TX MIMO processor 720 applies beamforming weights to the symbols of the data streams and to the antenna from which the symbol is being transmitted.

Each transmitter 722 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 722a through 722t are then transmitted from $N_T$ antennas 724a through 724t, respectively.

At receiver system 750, the transmitted modulated signals are received by $N_R$ antennas 752a through 752r and the received signal from each antenna 752 is provided to a respective receiver (RCVR) 754a through 754r. Each receiver 754 conditions (e.g., filters, amplifies, and downconverts) a respective received signal, digitizes the conditioned signal to provide samples, and further processes the samples to provide a corresponding "received" symbol stream.

An RX data processor 760 then receives and processes the $N_R$ received symbol streams from $N_R$ receivers 754 based on a particular receiver processing technique to provide $N_T$ "detected" symbol streams. The RX data processor 760 then demodulates, deinterleaves, and decodes each detected symbol stream to recover the traffic data for the data stream. The processing by RX data processor 760 is complementary to that performed by TX MIMO processor 720 and TX data processor 714 at transmitter system 710.

A processor 770 periodically determines which pre-coding matrix to use (discussed below). Processor 770 formulates a reverse link message comprising a matrix index portion and a rank value portion.

The reverse link message may comprise various types of information regarding the communication link or the received data stream. The reverse link message is then processed by a TX data processor 738, which also receives traffic data for a number of data streams from a data source 736, modulated by a modulator 780, conditioned by transmitters 754a through 754r, and transmitted back to transmitter system 710.

At transmitter system 710, the modulated signals from receiver system 750 are received by antennas 724, conditioned by receivers 722, demodulated by a demodulator 740, and processed by a RX data processor 742 to extract the reserve link message transmitted by the receiver system 750. Processor 730 then determines which pre-coding matrix to use for determining the beamforming weights then processes the extracted message.

In an aspect, logical channels are classified into Control Channels and Traffic Channels. Logical Control Channels comprises Broadcast Control Channel (BCCH), which is DL channel for broadcasting system control information. Paging Control Channel (PCCH), which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bidirectional channel that transmits dedicated control information and used by UEs having an RRC connection. In aspect, Logical Traffic Channels comprises a Dedicated Traffic Channel (DTCH), which is Point-to-point bi-directional channel, dedicated to one UE, for the transfer of user information. In addition, a Multicast Traffic Channel (MTCH) for Point-to-multipoint DL channel for transmitting traffic data.

In an aspect, Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), an Uplink Shared Data Channel (UL-SDCH) and plurality of PHY channels. The PHY channels comprise a set of DL channels and UL channels.

The DL PHY channels comprises: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); Load Indicator Channel (LICH); The UL PHY Channels comprises: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); Broadband Pilot Channel (BPICH).

Figure 7:
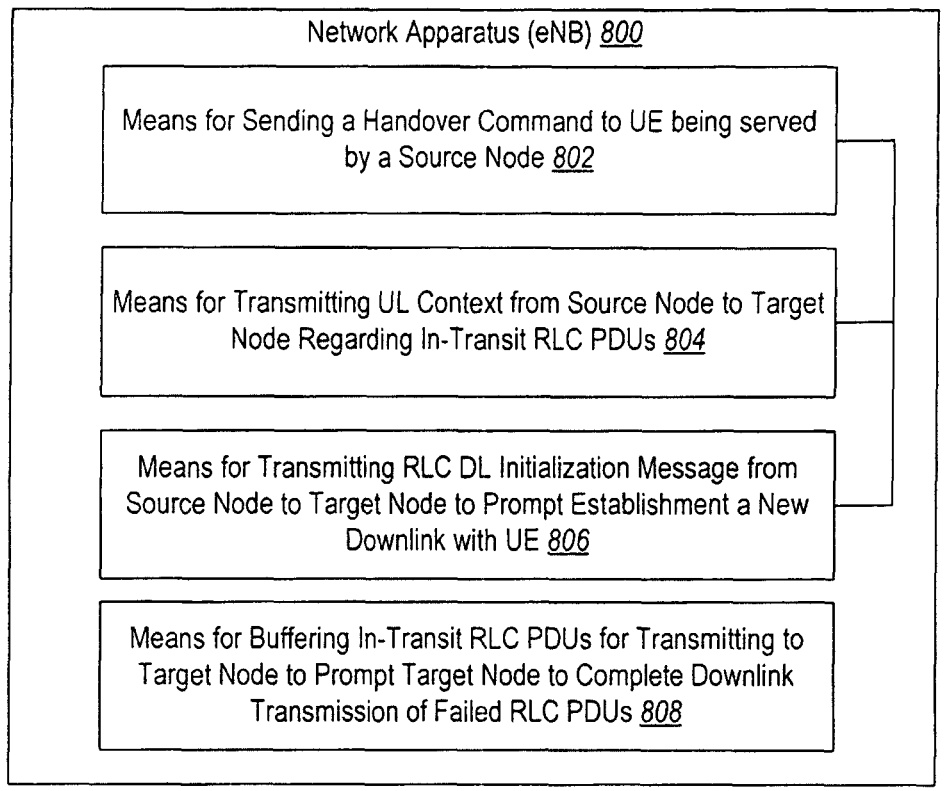
FIG. 7 illustrates a block diagram of an evolved Base Node (eNB) having modules configured to cause a computer to perform the functions for network controlling hard handover.

In FIG. 7, in another aspect, an access node, depicted as an evolved base node 800, includes modules that provide a means to cause a computer to participate in or to perform the methodologies for network-controlled handover in a wireless data packet communication system to avoid user data loss of FIGS. 2-3. A module 802 provides means for sending a handover command to a user equipment (UE) being served by a source node. A module 804 provides means for transmitting RLC Uplink (UL) context from the source node to the target node regarding in-transit RLC packet data units (PDUs). A module 806 provides means for transmitting RLC Downlink (DL) initialization message from the source node to the target node to prompt establishment a new downlink with the UE. A module 808 provides means for buffering in-transit RLC PDUs for transmitting to the target node to prompt the target node to complete downlink transmission of failed RLC PDUs.

Figure 8:
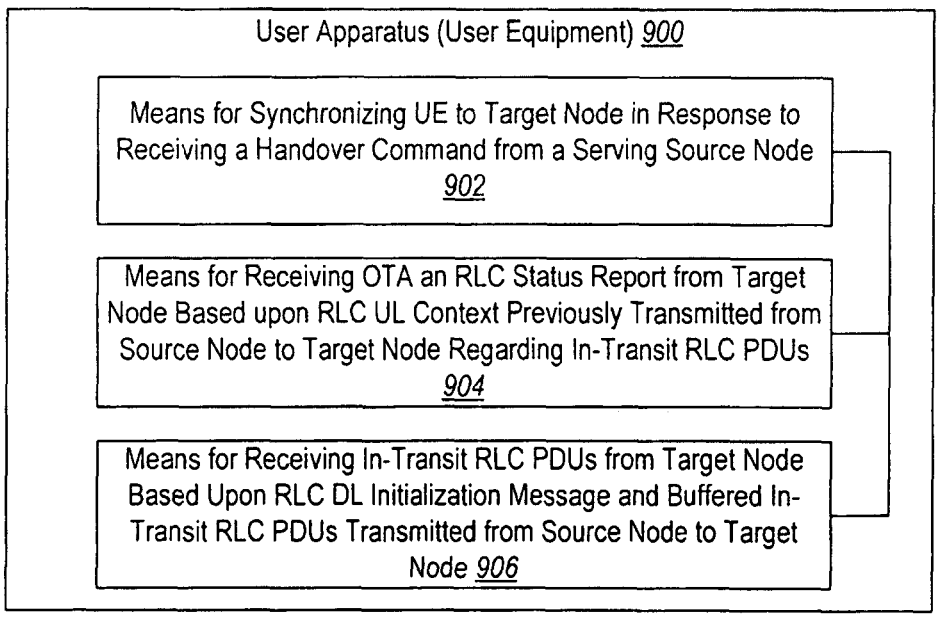
FIG. 8 illustrates a block diagram of user equipment (UE) having modules configured to cause a computer to perform the functions for assisting in hard handover.

In FIG. 8, in another aspect, an access terminal, depicted as user equipment 900, includes modules that provide a means to cause a computer to participate in or to perform the methodologies for user equipment assisted handover in a wireless data packet communication system to avoid user data loss of FIGS. 2-3. A module 902 provides means for synchronizing user equipment (UE) to a target node in response to receiving a handover command from a serving source node. A module 904 provides means for receiving over-the-air an RLC status report from the target node based upon RLC Uplink (UL) context previously transmitted from the source node to the target node regarding in-transit RLC packet data units (PDUs). A module 906 provides means for receiving in-transit RLC PDUs from the target node based upon RLC Downlink (DL) initialization message and buffered in-transit RLC PDUs transmitted from the source node to the target node.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts or events of the various methods.

In addition, while a particular feature may have been disclosed with respect to only one of several implementations, such feature may be combined with one or more other features of the other implementations as may be desired and advantageous for any given or particular application. To the extent that the terms "includes," and "including" and variants thereof are used in either the detailed description or the claims, these terms are intended to be inclusive in a manner similar to the term "comprising." Furthermore, the term "or" as used in either the detailed description of the claims is meant to be a "non-exclusive or".

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the evolved RAN (e.g., access point, eNode B) can infer or predict data traffic conditions and opportunities for facilitating handover to another type of RAT with reduced latency and connection errors based on previous interactions with the same or like machines under similar conditions.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method for radio link control (RLC) polling and status report timing in a wireless network, comprising:

transmitting data packets in an acknowledge mode communication channel to a receiver;

determining that status reporting from the receiver is warranted;

transmitting a polling status request separate from the transmitted data packets, wherein the transmitting the polling status request is performed in response to receiving acknowledgement information for all of the transmitted data packets when up-to-date polling is required; and
receiving a status report from the receiver sent without delay.

2. The method of claim 1, further comprising determining that status reporting is warranted by determining that the receiver has completed sending the acknowledgement information for the transmitted data packets.

3. The method of claim 2, further comprising determining that status reporting is warranted by determining a last data indication of a transmitter RLC buffer.

4. The method of claim 1, further comprising transmitting data packets in a Hybrid Automatic Repeat-reQuest (HARQ) communication channel.

5. The method of claim 4, further comprising performing local not acknowledged (Nak) communication between an RLC entity and a HARQ component of a medium access channel (MAC) layer.

6. The method of claim 1, further comprising:
determining that status reporting is warranted by determining that the up-to-date polling is not required, wherein the transmitting is performed irrespective of receiving the acknowledgment information for all of the transmitted data packets.

7. The method of claim 6, further comprising determining that the up-to-date polling is not required when advancing a transmitter window.

8. At least one processor for radio link control (RLC) polling and status report timing in a wireless network, comprising:
a first module for transmitting data packets in an acknowledge mode communication channel to a receiver;
a second module for determining that status reporting from the receiver is warranted and for determining whether the receiver has completed sending acknowledgment information for the transmitted data packets;
a third module for transmitting a polling status request separate from the transmitted data packets, wherein the third module waits to transmit the polling status request until the second module determines that the receiver has completed sending the acknowledgment information for the transmitted data packets; and
a fourth module for receiving a status report from the receiver.

9. An apparatus for radio link control (RLC) polling and status report timing in a wireless network, comprising:
means for transmitting data packets in an acknowledge mode communication channel to a receiver;
means for determining that status reporting from the receiver is warranted, prior to receiving acknowledgement information for all of the transmitted data packets;
means for transmitting a status request separate from the transmitted data packets in response to receiving the acknowledgement information for all of the transmitted data packets; and
means for receiving a status report from the receiver sent without delay.

10. An apparatus for radio link control (RLC) polling and status report timing in a wireless network, comprising:
a transmitter component for transmitting data packets in an acknowledge mode communication channel to a receiver and for transmitting a polling status request separate from the transmitted data packets;
an RLC poll criteria component for determining that status reporting from the receiver is warranted; and
a receiver component for receiving acknowledgement information for the transmitted data packets and for receiving a status report from the receiver, wherein the transmitter component waits to transmit the polling status request until the receiver component receives the acknowledgement information for the transmitted data packets when up-to-date polling is required.

11. The apparatus of claim 10, wherein the RLC poll criteria component further determines that status reporting is warranted by determining that the receiver has completed sending the acknowledgement information for the transmitted data packets.

12. The apparatus of claim 11, wherein the RLC poll criteria component further determines that a status report is warranted by determining a last data indication in a transmitter RLC buffer.

13. The apparatus of claim 10, wherein the transmitter component further transmits data packets in a Hybrid Automatic Repeat-reQuest (HARQ) communication channel.

14. The apparatus of claim 13, wherein the RLC poll criteria component further performs local not acknowledged (Nak) communication between an RLC entity and a HARQ component of a medium access channel (MAC) layer.

15. The apparatus of claim 10, wherein:
the RLC poll criteria component further determines that status reporting is warranted by determining that the up-to-date polling is not required; and
the transmitter component further transmits the status request before the receiver component has received the acknowledgement information for the transmitted data packets.

16. The apparatus of claim 15, wherein the RLC poll criteria component further determines that the up-to-date polling is not required when advancing a transmitter window.

17. A method for radio link control (RLC) polling and status report timing in a wireless network, comprising:
receiving data packets in an acknowledge mode communication channel from a transmitter;
initiating transmission of acknowledgement information for the received data packets;
receiving a polling status request separate from the received data packets when the transmitter has determined that status reporting from a receiver is warranted, wherein the polling status request is received upon completing the transmission of the acknowledgement information for the data packets when the transmitter has determined that up-to-date polling is required; and
transmitting a polling status report from the receiver sent without delay.

18. The method of claim 17, wherein the initiating the transmission of acknowledgement information for the data packets further comprises:
transmitting acknowledgements for data packets successfully received and not acknowledged for data packets not successfully received; and
receiving the polling status request after the transmitter has determined that status reporting is warranted by determining that the receiver has completed sending the acknowledgement information for the transmitted data packets.

19. The method of claim 17, further comprising receiving data packets in a Hybrid Automatic Repeat-reQuest (HARQ) communication channel.

20. The method of claim 19, further comprising performing local not acknowledged (Nak) communication between an RLC entity and a HARQ component of a medium access channel (MAC) layer.

21. The method of claim 17, further comprising:
receiving the polling status request before completing the transmission of the acknowledgment information for the data packets, wherein the acknowledgment information for the data packets comprises acknowledgements for data packets successfully received and not acknowledged for data packets not successfully received.

22. The method of claim 21, further comprising receiving the polling status request after the transmitter determines that the up-to-date polling is not required when advancing a transmitter window.

23. A computer program product for radio link control (RLC) polling and status report timing in a wireless network, comprising:
a non-transitory computer-readable storage medium comprising,
a first set of codes for causing a computer to receive data packets in an acknowledge mode communication channel from a transmitter;
a second set of codes for causing the computer to receive a polling status request separate from the received data packets in response to completing transmission of acknowledgement information for the received data packets when up-to-date polling is required; and
a third set of codes for causing the computer to transmit a status report without delay in response to receiving the polling status request.

24. An apparatus for radio link control (RLC) polling and status report timing in a wireless network, comprising:
means for receiving data packets in an acknowledge mode communication channel from a transmitter;
means for receiving a polling status request separate from the received data packets in response to completing transmission of acknowledgment information for the packets; and
means for transmitting a status report without delay in response to receiving the polling status request.

25. An apparatus for radio link control (RLC) polling and status report timing in a wireless network, comprising:
a receiver component for receiving data packets in an acknowledge mode communication channel from a transmitter and for receiving a polling status request separate from the received data packets; and
a transmitter component for transmitting acknowledgement information for the data packets and for transmitting a status report without delay, wherein the receiver component receives the polling status request upon the transmitter component completing the transmitting of the acknowledgement information for the data packets when up-to-date polling is required.

26. The apparatus of claim 25, wherein the acknowledgement information comprises acknowledgements for data packets successfully received and not acknowledged for data packets not successfully received; and
the receiver component further receives the polling status request after the transmitter has determined that status reporting is warranted by determining that the receiver has completed sending the acknowledgement information for the transmitted data packets.

27. The apparatus of claim 25, wherein the receiver component further receives data packets in a Hybrid Automatic Repeat-reQuest (HARQ) communication channel.

28. The apparatus of claim 27, further comprising an RLC entity and HARQ component of a medium access channel (MAC) layer, the RLC entity for performing local not acknowledged (Nak) communication with the HARQ component.

29. The apparatus of claim 25, wherein the receiver component further receives the polling status request before the transmitter component has completed the transmitting of the acknowledgement information for the data packets, the acknowledgment information comprising acknowledgments for data packets successfully received and not acknowledged for data packets not successfully received.

30. The apparatus of claim 29, wherein the receiver component further receives the polling status report after the transmitter determines that the up-to-date polling is not required when advancing a transmitter window.

31. A computer program product for radio link control (RLC) polling and status report timing in a wireless network, comprising:
a non-transitory computer-readable storage medium comprising,
a first set of codes for causing a computer to transmit data packets in an acknowledge mode communication channel to a receiver;
a second set of codes for causing the computer to determine that status reporting from the receiver is warranted;
a third set of codes for causing the computer to transmit a polling status request separate from the transmitted data packets wherein the polling status request is transmitted in response to receiving acknowledgement information for all the transmitted data packets when up-to-date polling is required; and
a fourth set of codes for causing the computer to receive a status report from the receiver sent without delay.

32. At least one processor for radio link control (RLC) polling and status report timing in a wireless network, comprising:
a first module for receiving data packets in an acknowledge mode communication channel from a transmitter;
a second module for receiving a polling status request separate from the received data packets in response to completing transmission of acknowledgement information for the received data packets when up-to-date polling is required; and
a third module for transmit a status report without delay in response to receiving the polling status request.

* * * * *